United States Patent [19]

Harris

[11] Patent Number: 5,175,421
[45] Date of Patent: Dec. 29, 1992

[54] DUAL DEPTH OF FIELD DEFLECTOR FOR BAR CODE SCANNERS

[75] Inventor: Richard H. Harris, Raleigh, N.C.

[73] Assignee: International Business Machines Corporation, Armonk, N.Y.

[21] Appl. No.: 345,603

[22] Filed: May 1, 1989

[51] Int. Cl.$^5$ .................. G02B 26/08; G06K 7/10
[52] U.S. Cl. .................. 235/467; 235/462; 235/470; 259/226
[58] Field of Search ............ 235/467, 462, 472, 470, 235/454; 358/481; 350/6.8, 6.5, 6.7; 250/235, 236

[56] References Cited

U.S. PATENT DOCUMENTS

| | | | |
|---|---|---|---|
| 3,978,317 | 8/1976 | Yamaguchi et al. | 235/467 |
| 4,006,343 | 2/1977 | Izura et al. | 235/740 |
| 4,560,862 | 12/1985 | Eastman et al. | 235/462 |
| 4,587,407 | 5/1986 | Ahned et al. | 235/467 |
| 4,591,242 | 5/1986 | Boockman et al. | 235/457 |
| 4,713,532 | 12/1987 | Knowles | 235/467 |
| 4,748,316 | 5/1988 | Dickson | 235/457 |
| 4,776,308 | 8/1988 | Karlsson | 250/236 |
| 4,795,224 | 1/1989 | Goto | 235/467 |
| 4,871,904 | 10/1989 | Metlitsky et al. | 235/470 |
| 4,915,465 | 4/1990 | Sugiura | 350/6.5 |
| 4,939,355 | 7/1990 | Rando et al. | 235/462 |
| 5,059,779 | 10/1991 | Krichever et al. | 235/462 |

FOREIGN PATENT DOCUMENTS 0206454 4/1986 European Pat. Off.
0319237 11/1988 European Pat. Off.
0323026 11/1988 European Pat. Off.

OTHER PUBLICATIONS

Mesures Regulation Automatisme vol. 46, No. 8/9, Aug./Sept. 1981, pp. 41, 43, 45 47, Paris, Fr; "Laser et microprocesseur decryptent des codes a barres dans l'espace".
Patent Abstracts of Japan vol. 12, No. 58; Patent Abstracts of Japan, vol. 11, No. 107; Patent Abstracts of Japan vol. 8, No. 51; Patent Abstracts of Japan, vol. 11, No. 219.

Primary Examiner—Harold Pitts
Assistant Examiner—Christopher Glembock
Attorney, Agent, or Firm—Joscelyn G. Cockburn

[57] ABSTRACT

An optical bar code scanner uses an improved deflector which deflects a scanning beam along different path lengths within the scanner. The beam is focused at different focal points outside a scanning window of said scanner. The different focal points provide a continuous depth of field with significant range. In one design the rotating deflector is configured as an asymmetrical polygon having a plurality of flat mirrors mounted on a support structure.

14 Claims, 3 Drawing Sheets

DUAL DEPTH OF FIELD DEFLECTOR FOR BAR CODE SCANNERS

BACKGROUND OF THE INVENTION

1. Field of the Invention

The present invention relates to optical scanners in general and more particularly to optical scanners capable of reading high density bar codes over a wide range of distances from the scanner.

2. Prior Art

Optical bar code scanners for use in retail checkout operations at supermarkets and other retail establishments are gaining wider and wider acceptance. The typical bar code scanner is usually mounted within a counter and has a window at the top thereof through which a scanning pattern is projected. The scanning pattern is formed by a laser and associated optical components which produce plural scan lines that intersect in various patterns. If an article imprinted with a bar code, such as the Uniform Product Code (UPC) is placed into the field of the scan pattern and the bar code is scanned by the scan pattern, light is reflected from the bar code back through the scanner window.

A photodetector converts the reflected light into an electrical signal which is applied to dedicated hardware or to a microprocessor which finds and decodes the symbol into a stream of electrical signals. When the signal has been found and decoded, it is passed onto a point of sale terminal or store controller where it is used to access records that provide a brief description of the item as well as pricing information. The pricing information and item description are used at the point of sale terminal to prepare customer receipt and to calculate transaction totals.

In order to ensure the continued acceptance of scanners as a vital tool in the retail business, there has been a constant effort on the part of manufacturers to improve the performance of these scanners. One area which is being improved is the scanner's "depth of field." The "depth of field" of a scanner is the range of distances over which the scanner can successfully read the smallest bar code label allowed by the standards authority for the particular bar code being read. The range of distances usually extends from the scanner window to one or more focal points in space. The focal points are points in space where the scanning beam is focused by the scanner's optical system.

Stated another way, the "depth of field" of a bar code scanner is an indication of the distance, relative to the scanner window, whereat a bar code label can be placed and still be read by the scanner. By designing the scanner with a large depth of field an operator, at a checkout stand, is free to position an article at different distances from the scanner window and still have the bar code read by the scanner. This freedom tends to improve the productivity of the operator and also ensures the continued acceptance of the scanner.

The prior art has provided scanners with single and multiple focal points. U.S. Pat. No. 4,713,532 to Carl H. Knowles discloses a scanner with a single focal point. The scanner has a symmetrical rotating deflector which deflects and focuses a laser beam at a single point above the window of the scanner. The deflector is formed from a plurality of angled single faceted mirrors. Due to the single focal point, this type of scanner has a relatively small "depth of field."

Scanners with multiple "focal points" and relatively large "depths of field" are set forth in U.S. Pat. Nos. 4,748,316, 4,591,242 and 4,560,862. In U.S. Pat. No. 4,748,316 a rotating holographic disc is used to create the different focal points. In U.S. Pat. No. 4,591,242 and 4,560,862 complicated configurations which include optical lenses, multiple lasers, modulators, etc. are used to generate the multiple focal points. Even though these scanners work well for their intended purpose, the drawback is that they tend to be expensive, unreliable, and difficult to repair when breakdown occurs.

SUMMARY OF THE INVENTION

It is, therefore, the main object of the present invention to provide a low-cost bar code scanner with a large depth of field.

The objective and others are achieved by using a rotating deflector that causes the scanning laser beam to traverse different path lengths within the scanner. As the beam exits the scanner window, it is focused at different points relative to the window. The sum of the focal points creates a large depth of field for the scanner.

More particularly, a scanner constructed in accordance with the present invention includes a coherent light source which generates a light beam. Optical components, such as mirrors, etc. fold the light beam onto an asymmetrical rotating deflector which deflects the light beam and causes it to exit the window and focus at different points above the window. The asymmetrical deflector includes a plurality of facets each with two mirrors angled relative to one another and supported on a hub which is rotated by a motor. As the deflector rotates, each facet reflects the beam from points which are approximately displaced 180 degrees. This causes the beam to travel along different paths and converge (focus) at different points above the window of the scanner. A bar code located anywhere within the overall depth of field of the scanner is read.

DETAILED DESCRIPTION OF THE PREFERRED EMBODIMENT

Figure 1:
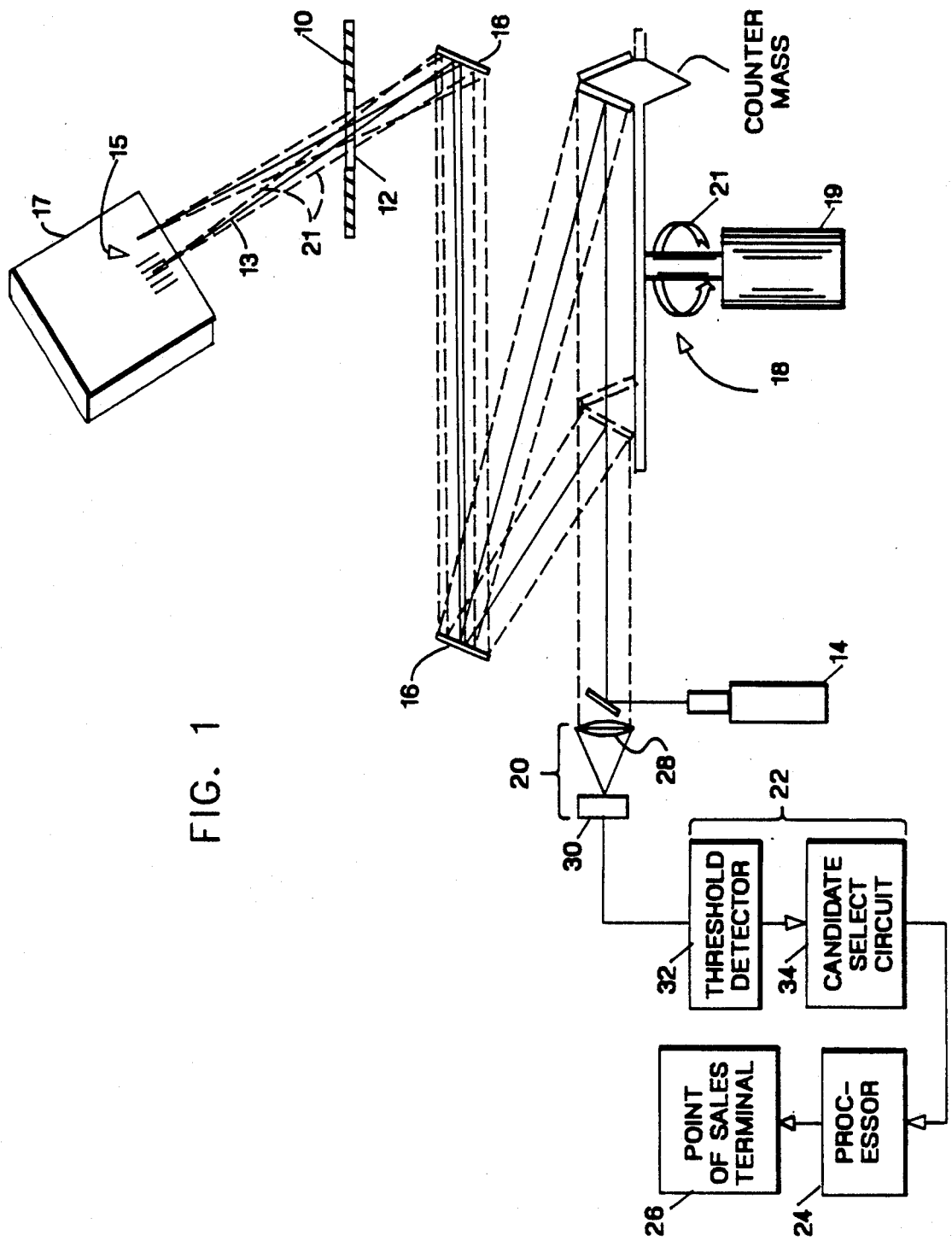
FIG. 1 is a block diagram for a point of sale system including a scanner according to the teachings of the present invention.

FIG. 1 shows a schematic of a point of sale system which includes a bar code scanner according to the teachings of the present invention. The point of sale system is normally incorporated in the checkout counter of a store. The top surface 10 of the scanner includes a transparent scanner window 12 through which scanning rays are directed to scan a bar code pattern 15 (such as the UPC code) placed on a grocery item 17. Usually, the item is brought into the scanning pattern by a checkout clerk (not shown) to enable the pattern to sweep across the code whereupon light reflected from the bar code is received back by components of the scanner which process and decode the bar code bearing signals as is conventional.

The scanner components located below the top surface 10 include light source 14, a plurality of beam folding mirrors 16, deflecting device 18, electro/optical device 20, electronic circuit arrangement 22, processor 24 and point of sale terminal 26.

Preferably, light source 14 is a laser which generates a light beam which is focused by lens (not shown) onto deflecting assembly 18. The deflecting assembly 18 is an essential component of the present scanner, and the details will be given hereinafter. Suffice it to say that the deflecting assembly 18 deflects the light beam from at least two displaced points as it is rotated by motor 19 in the direction shown by arrow 21. As a result, the beam is made to travel different distances within the scanner and focuses at different points above the surface of the scanner. As a result, when an article 17 carrying bar code pattern 15 is positioned within the focal area, the laser pattern is reflected from the bar code area back into the scanner.

In particular, light 21 reflecting from the grocery item may take a retroreflective path through the plurality of beam folding mirrors 16 to the collection lens 28. It should be noted that light rays reflecting from the bar code are shown with broken lines; while light rays from the laser 14 are shown with solid lines. The mirrors direct most of the returning light through a collection lens 28 to a photo detector 30. The photo detector 30 converts the return optical signal to a corresponding electrical signal which is applied to the threshold and shaping circuit 32. The function of the threshold and shaping circuit 32 is to convert the often irregular electrical signals provided by photo detector 30 into a square wave pulse train in which the duration of each pulse is a function of the width of the light or dark area being traversed by the laser beam. The output of the threshold and shaping circuit 32 is applied to a candidate select circuit 34 which isolates any signals representing symbols from the overall string of symbols most of which are optical noise produced when the laser beam traverses text or graphics. Candidates selected in circuit 34 are applied to the processor 24 which selects one of those candidates as a final symbol, decodes that symbol and sends it to the point of sale terminal 26 where price lookup, inventory control, etc. operations are initiated. It should be noted that the folding mirrors, laser, etc. are conventional components which can be arranged in various relationships and the showing in FIG. 1 should not be construed as a limitation on the scope of the present invention.

Figure 2:
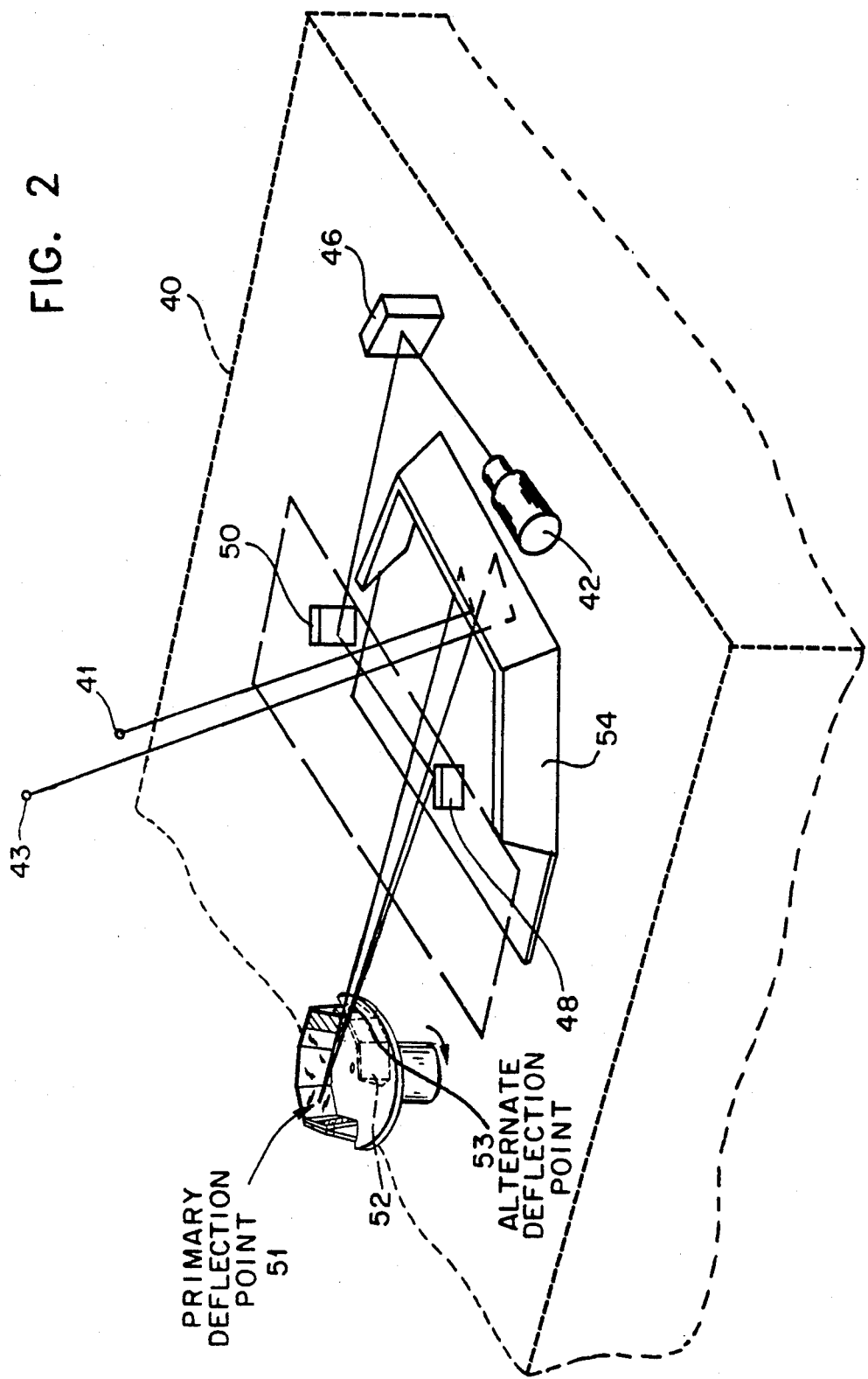
FIG. 2 is a perspective view of the scanner and the asymmetrical dual depth of field deflector.

FIG. 2 is a perspective view of a bar code scanner package in accordance with the teachings of the present invention. The top surface of the scanner is removed to show the internal components and their relationship to the laser beam. The scanner includes a housing 40 which supports the internal components of the scanner. A laser device 42 generates a focused laser beam which is routed by folding mirrors 46, 48 and 50 onto deflector assembly 52. The deflector assembly 52 is coupled to a motor 19 which drives the deflector assembly at a speed ($\omega$) omega. As a result, the double-mirrored facets (to be described later) of the deflector deflect the laser beam from a primary deflection point 51 and an alternate deflection point 53. The reflected beam from the primary deflection point and alternate deflection point is folded by mirror assembly 54 to exit the scanner. The reflected beams are focused at focal planes 41 and 43 outside of the scanner. The depth of fields of these focal planes overlap, and the combination provides a wide depth of field for the scanner. As before, a bar code which is positioned within these overlapping depth of fields is easily read.

Unlike conventional bar code scanners wherein a symmetrical polygonal deflector deflects the beam from a single deflection point within the scanner, the theory of the present invention is to provide a deflector which deflects the beam from multiple deflection points and causes it to travel different path lengths within the scanner. As a result of the different path lengths, the beam focal point occurs at different points external to the scanner. As a result, the scanner is provided with a depth of field which is greater than prior art scanner. Having described the theory of my invention, the deflector which provides multi-point deflection will now be described.

Figure 3:
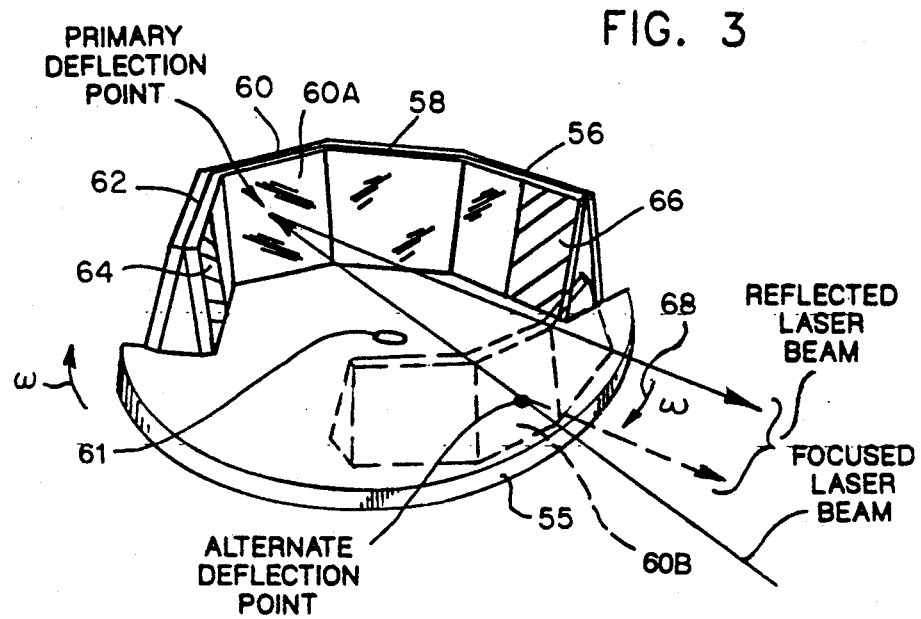
FIG. 3 is a perspective view of the asymmetrical dual depth of field deflector and its coaction with a scanning beam.
Figure 4:
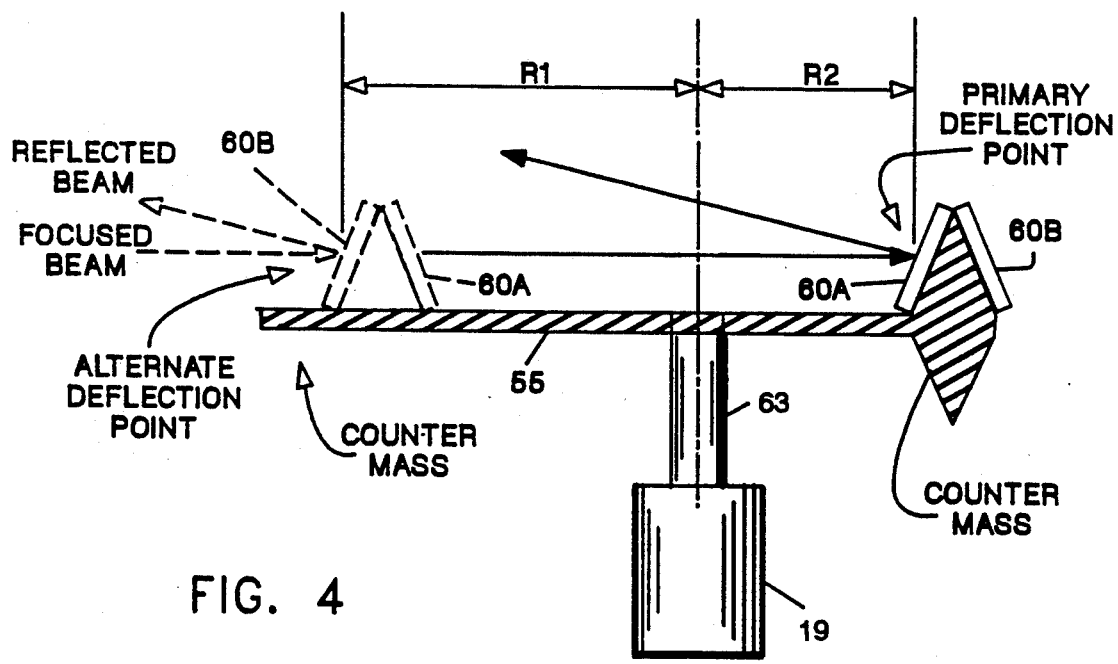
FIG. 4 shows a partial side cross-sectional view of the asymmetrical dual depth of field deflector.

FIGS. 3 and 4 show schematics of an asymmetrical deflector according to the teachings of the present invention. FIG. 3 shows a perspective view of the deflector, and FIG. 4 shows a side view of the deflector. The asymmetrical deflector includes a disc or support member 55. A plurality of deflecting members or deflecting facets 62, 60, 58 and 56 are mounted around the periphery of support member 55. The disc and deflecting members are mounted via opening 61 to the shaft 63 of drive motor 19. The deflecting members are angled relative to each other and mirrors are placed on each surface. Stated another way, the deflecting facets consist of two mirrors with each deflecting the incident laser beam. The end members 62 and 56 may be opaque or non-reflective in the areas identified by numerals 64 and 66, respectively to eliminate double reflection within the deflectors. Another way of describing the deflector assembly is to view it as a symmetrical deflecting polygon with mirrors removed from one side and placed behind the mirrors of the remaining facets. Thus, each facet deflects the laser beam from a primary and an alternative deflection point.

Still referring to FIGS. 3 and 4, as the motor rotates the deflecting mechanism, each reflecting surface on a facet, such as facet 60, reflects the beam from at least two points identified in FIGS. 3 and 4, as the alternate deflection point and the primary deflection point. In particular, when facet 60 is positioned at the farthest point of its trajectory relative to the beam (at this point the facet is shown with solid lines in FIGS. 3 and 4). The beam is reflected, by the front mirror 60A of facet 60, to traverse one of its paths within the scanner. Similarly, when the back mirror 60B of facet 60 is positioned at the nearest point of its trajectory (at this point the facet is shown by broken lines) the back mirror 60B of the facet reflects the beam from its alternate deflection point. It should be noted that farthest and nearest are points relative to laser 42 (FIG. 2). The difference between the path length that the beam will travel within the scanner is approximately equivalent to $2(R1+R2)$ where R1 is the distance from the alternate deflection point to the center of disc 55 and R2 is the distance from the center of disc 55 to the primary deflection point. With reference to FIG. 4, counter masses are used on the disc 55 to balance it so that it is stable as it rotates.

It should be noted that other types of geometric structures, different number of facets and different facet locations will cause the beam to travel different path lengths within the scanner.

These variations of geometric structures, number of facets, facet locations, etc. are all within the skill of one skilled in the art, and it is the intent that the appended claims should cover such variations.

Having thus described my invention, what I claim as new, and desire to secure by Letters Patent is:

1. An improved bar code scanner for scanning bar code labels comprising:
   a single light source for generating a beam of light;
   optical means for intercepting and folding said beam of light;
   at least one two-sided rotating reflective member with reflective surfaces on opposite sides, said reflecting surfaces asymmetric with the axis of rotation of the rotating reflective member, said surfaces interrupting said beam of light twice per revolution to cause said beam of light to traverse different path lengths within said scanner to focus at different distances from a window of said scanner to generate a large depth of field in which the bar code labels are scanned at different distances from said window.

2. The bar code scanner of claim 1 wherein the light source includes a laser.

3. The improved bar code scanner of claim 1 wherein the double-sided mirrored reflecting surfaces are planar.

4. An improved bar code scanner for scanning bar code labels at different distances from the scanner comprising:
   a light source for generating a beam of light;
   optical means for intercepting and folding said beam of light; and
   a reflecting means having a motor a support member mounted to said motor and
   a plurality of two-sided reflective members mounted on said support member, said plurality of two-sided reflective members configured to form a partial enclosure with an opening located at one side of the support member, through which said beam of light passes to reflect off one side of each two-sided reflective members when said one side is positioned opposite to said opening to cause said light beam to traverse different path lengths within said scanner and focus at different distances from a window of said scanner.

5. An improved bar code scanner for generating electrical signals representative of a bar code which is affixed to an item comprising:
   a housing;
   a single light source for generating a light beam mounted in said housing;
   optical means for intercepting and folding said light beam;
   a movable reflector means having at least one two-sided planar mirror with the opposite sides of each mirror asymmetric to an axis of rotation of the movable reflector means, the opposite sides of said two-sided planar mirror reflecting the light beam once per revolution of said movable reflector means to cause said light beam to traverse different path lengths within said housing and to be focused at different focal points outside of said housing to provide a large depth of field that straddles the focal points.

6. The improved bar code scanner of claim 5 further including a plurality of mirrors for folding light rays reflected from said bar code;
   a focusing lens for focusing the light rays; and
   an electro/optical means for processing the light rays and output electrical signals representative of said bar code.

7. The improved bar code scanner of claim 5 wherein the opposite sides intercept the light beam 180 degrees apart.

8. An improved reflector mechanism for use with a bar code scanner comprising:
   a light source for generating a light ray a motor having a shaft; a support means mounted to the shaft of said motor; and
   a plurality of two-sided reflecting members arranged to partially encircle a periphery of said support means with the opposite sides of each reflecting member asymmetric to the axis of rotation of the support means, the opposite sides of each two-sided reflecting members reflecting the incident light ray once per revolution of said support means.

9. The improved reflector mechanism of claim 8 wherein the opposite sides intercept the light beam 180 degrees apart.

10. The improved mechanism for claim 8 wherein the reflecting members are arranged on said disc to form an open polygonal reflecting structure.

11. An improved deflector mechanism for use in a bar code scanner comprising:
    a light source for generating a light beam a motor with a shaft;
    a support disc mounted to said shaft; and
    a plurality of double-sided reflective members positioned on the support disc; said reflective members arranged to partially encircle a circumference of said disc so that a reflective member reflects said light beam twice per revolution of said support disc causing said light beam to traverse different path lengths within said scanner.

12. An improved bar code scanner for scanning bar code labels comprising:
    a light source for generating a beam of light;
    optical means for intercepting and folding said beam of light;
    reflecting means having a plurality of facets with each facet being a double-sided planar mirror with the reflective surfaces of each facet asymmetric to an axis of rotation of the reflecting means, in that each reflective surface of the facets reflects the light beam from different points and causes said light beam to traverse different path lengths within said scanner and focus at different distances from a window of said scanner;
    detection means for processing light signals reflecting from said bar code labels and for generating electrical signals; and
    computer means for processing the electrical signals and identifying an article to which the bar code is affixed.

13. The improved deflector mechanism of claim 12 wherein reflecting surfaces of each double-sided reflecting members are arranged at an incline angle.

14. The improved bar code scanner of claims 4 or 12 wherein the plurality of facets are angled relative to one another to form an asymmetrical reflecting structure.

* * * * *